United States Patent
Grigoriadis et al.

(10) Patent No.: US 7,698,635 B2
(45) Date of Patent: Apr. 13, 2010

(54) AUTOMATIC AUTHORING AND PUBLISHING SYSTEM

(75) Inventors: Irene Grigoriadis, Malibu, CA (US); Victor A. Ramirez, North Hollywood, CA (US)

(73) Assignee: OmegaBlue, Inc., Santa Monica, CA (US)

( * ) Notice: Subject to any disclaimer, the term of this patent is extended or adjusted under 35 U.S.C. 154(b) by 345 days.

(21) Appl. No.: 11/379,769

(22) Filed: Apr. 21, 2006

(65) Prior Publication Data
US 2006/0242569 A1 Oct. 26, 2006

Related U.S. Application Data

(60) Provisional application No. 60/674,157, filed on Apr. 21, 2005.

(51) Int. Cl.
*G06F 17/00* (2006.01)
(52) U.S. Cl. ........................ 715/243; 715/255
(58) Field of Classification Search ................ 715/243, 715/255
See application file for complete search history.

(56) References Cited

U.S. PATENT DOCUMENTS

| | | | |
|---|---|---|---|
| 5,133,051 A | | 7/1992 | Handley |
| 5,140,676 A | | 8/1992 | Langelaan |
| 5,146,404 A | * | 9/1992 | Calloway et al. ............... 705/1 |
| 5,228,121 A | | 7/1993 | Fontaine et al. |
| 5,890,177 A | | 3/1999 | Moody et al. |
| 6,052,514 A | | 4/2000 | Gill et al. |
| 6,167,409 A | * | 12/2000 | DeRose et al. ............... 715/234 |
| 6,233,592 B1 | | 5/2001 | Schnelle et al. |
| 6,343,302 B1 | | 1/2002 | Graham |
| 6,377,956 B1 | * | 4/2002 | Hsu et al. ................. 707/104.1 |
| 7,278,094 B1 | * | 10/2007 | Dreyer et al. ................ 715/234 |
| 7,337,399 B2 | * | 2/2008 | Jensen et al. ................. 715/255 |
| 2002/0046245 A1 | | 4/2002 | Hillar et al. |
| 2002/0156816 A1 | | 10/2002 | Kantrowitz et al. |
| 2003/0149935 A1 | | 8/2003 | Takizawa et al. |
| 2003/0149940 A1 | | 8/2003 | Fordyce et al. |
| 2004/0049742 A1 | * | 3/2004 | Yokoyama et al. .......... 715/530 |
| 2004/0243921 A1 | | 12/2004 | Carr et al. |

(Continued)

OTHER PUBLICATIONS

ProtoType Industries, Inc. Press Release Sep. 18, 2002.

(Continued)

*Primary Examiner*—Rachna S Desai
(74) *Attorney, Agent, or Firm*—Connolly Bove Lodge & Hutz LLP

(57) ABSTRACT

The invention relates to a system and method for automatically producing documents that incorporate one or more data elements. A guided/structured software environment is provided that assists users in creating manuals by defining the appropriate content for each manual section, content rules and relationships, and tasks to be performed for each type of manual entry. Manual content is stored as structured data elements, rather than pages of sentences, to more efficiently generate, revise, and store the content of a manual. A storage database is provided for retrieving and storing predefined templates, documents and individual data elements to produce a final manual. Manuals are created by combining various data elements. An instant preview interface permits a user to quickly view what revisions will look like in a final document prior to actually publishing the manual. A published manual is compiled by assembling the stored data elements and into a document.

18 Claims, 13 Drawing Sheets

U.S. PATENT DOCUMENTS

| | | |
|---|---|---|
| 2005/0022104 A1 | 1/2005 | Wrenholt et al. |
| 2005/0022118 A1 | 1/2005 | Wefers et al. |
| 2005/0050442 A1* | 3/2005 | Pope et al. ............ 715/500 |
| 2005/0204047 A1* | 9/2005 | Mitchell et al. ........ 709/228 |
| 2006/0010172 A1* | 1/2006 | Grigoriadis et al. .... 707/200 |
| 2006/0155700 A1 | 7/2006 | Dejean et al. |
| 2006/0271603 A1* | 11/2006 | Mathias ................. 707/201 |

OTHER PUBLICATIONS

ProtoType Industries, Inc. Press Release Sep. 2, 2003.
ProtoType Industries, Inc. Web Page Feb. 4, 2005.
Office Action for related U.S. Appl. No. 11/553,437 with Notice of References Cited, dated Sep. 30, 2009 total 20 pages.
Office Action for related U.S. Appl. No. 11/677,461 with Notice of References Cited, dated Oct. 5, 2009 total 31 pages.

\* cited by examiner

AUTOMATIC AUTHORING AND PUBLISHING SYSTEM

CLAIM OF PRIORITY UNDER 35 U.S.C. §119

The present Application for Patent claims priority to U.S. Provisional Patent Application No. 60/674,157, entitled "Automatic Authoring and Publishing System", filed Apr. 21, 2005, assigned to the assignee hereof, and hereby expressly incorporated by reference herein.

FIELD

The present invention relates to authoring and publishing software tools. More particularly, at least one embodiment provides an assisted authoring and publishing software tool that guides users in authoring and publishing manuals with structured templates having defined content areas, data pools of permissible content, structured data storage, and synthetic text generation.

BACKGROUND

During a production process of aircraft and other products, alterations or modifications to the aircraft product must be reflected in the corresponding technical, maintenance, and/or end-user documentation or manuals. For instance, as the audio/video system in a commercial aircraft is upgraded or changed the corresponding manuals have to be modified according to industry rules or regulations. Since an aircraft fleet may include aircraft having different combinations of systems or upgrades, different sets of manuals or instructions are often needed to support all aircraft in the fleet. Maintaining and generating the various document revisions leads to a tedious, time consuming, and potentially error-prone process.

Existing documentation techniques typically employ intricate versioning schemes, esoteric document "languages" and large amounts of storage to hold all the different permutations of the documentation. U.S. Pat. No. 6,377,956 discloses a process in which documents are manually altered or revised, while older document versions are added to an ever growing database of complete documents before finally assembling the final document. The older document versions are maintained with all associated graphics, text and diagrams related to each document. However, with this approach, the size of the database eventually becomes very large and, consequently, processing of the documents slows down. U.S. Pat. No. 6,377,956 also relies on manual, unassisted editing of existing documents that typically requires specialized knowledge of the subject matter by the author, editor and others reviewing the document. That is, the person editing such documents would need to have specific knowledge about the product and the product's history to be able to ascertain whether the associated graphics, text and diagrams in the documentation are correct. A quality assurance reviewer or editor familiar with the technology, steps, or processes described in the documentation would need to review the final document for reliability. An author or reviewer may be required to re-learn an entire area of knowledge to update older documents. In complex technical systems, the possibilities for errors are proportional to the amount of knowledge required by the authors and reviewers. The potential for error may result in safety violations or other dangerous situations. Further, the author-reviewer-rewrite cycle is time consuming and inefficient.

United States Patent Publication 2005/0022118 describes using a template where all the required elements that form the output must be maintained in exactly the same location otherwise the template is unable to recreate the document accurately. This technique is rigid, inflexible, and in most cases requires the author to make the template out of a document description language as described in U.S. Pat. No. 6,377,956. This requires the author to have extra knowledge about the structural requirements of the book/manual and how the selected templates may affect the final output. For example, in the airline industry the Federal Aviation Administration (FAA) and the Federal Transit Administration (FTA) require documentation to meet specific standards. Authors constantly review the formatting requirements to comply with changing governmental regulations. Further, U.S. Patent Publication 2005/0022118 only allows the structure of the book to be shown, and does not preview the final product for the author to see the effect of any changes. Thus, the author has to wait until the content is published and then make alterations in a repetitive cycle until the document is satisfactory. Any changes made during the review process starts the cycle over again wasting time and delaying production of the documentation required.

Thus, for the reasons discussed above, prior art document production and storage techniques are inadequate to generate, structure, and store multiple altered versions of a document. Furthermore, the ability to check and track changes made is slow and cumbersome due to the number of document comparisons that must be made. Therefore, there is a need for a system and method that assist and guide authors in creating highly structured documents that are automatically assembled, formatted, and reproduced to accurately reflect all the elements of the system with minimal knowledge required of the author. A further need exists for a system and method for updating and maintaining such documents to reflect the specific elements actually used in the project.

SUMMARY

One embodiment of the present invention assists users in automatically generating content and publishing technical manuals for large-scale, complex products and services for building, maintaining, servicing, and/or retrofitting aircraft.

One feature provides a guided or structured software environment that assists users in creating manuals by defining the appropriate data structures and content for each manual section, content rules and relationships, and tasks to be performed for each type of manual entry. Predefined templates and data structures are used to facilitate the creation of data elements and compile a final manual.

Another feature provides for storing the manual content as structured data elements, rather than as sentences or paragraphs, to more efficiently generate, revise, and store the content of a manual. That is, rather than storing content as complete pages of text (e.g., sentences, paragraphs), tables, and/or graphics, the present invention stores the content as distinct data elements in a database. This also allows different manuals to be compiled using some of the same data elements, thereby saving storage space. Moreover, this approach to storage of content permits a single data element to be modified to propagate that modification to all other manuals referencing that data element.

Yet another novel feature provides an instant preview mode that permits an author to quickly view what revisions will look like in a final document prior to actually publishing the manual. A publishing engine publishes the manual by assembling the stored data elements and compiling them into a single document.

A compiled document may be converted into an XML document and forwarded to an Extensible Stylesheet Language Transformation (XSLT) where it is output in a user selected format. While several of the examples described herein relate to aircraft service or maintenance manuals, it should be understood that the various features of the present invention may be implemented in a wide array of document creation processes for various purposes, products, and/or systems besides aircraft.

One implementation of the invention provides a method for authoring and publishing a document. A document template is defined based on a plurality of predefined data elements arranged in a tree-like data structure. One or more of the predefined data elements are edited using content-specific pull-down menus. The revised data elements are stored in a relational database to store a customized document. Text is automatically synthesized from the revised data elements by compiling the revised data elements according to the structure defined by the document template to generate the customized document. An effectivity in the customized document may be tracked to track one of the predefined data element or revised data element across multiple other documents. The plurality of predefined data elements may be selected from the group consisting of text, quantity, descriptions, procedures and graphical metadata. The step of editing one or more of the predefined data elements may include performing tasks pre-associated with the predefined data elements. One of the predefined data elements or revised data elements may be cross-referenced to one or more other documents. The content-specific pull-down menus may be dynamically generated based on a defined content type of the document template. The customized document may be previewed prior to publishing. The customized document may be published by performs the steps of: (1) converting the customized document into an extensible markup language document; (2) forwarding the extensible markup language document to an extensible stylesheet transform; and (3) outputting the extensible markup language document from the extensible stylesheet transform as a published document. A internet-based change request may be received to effect a change to the published document. This method may also be implemented on hardware, software, or a combination thereof.

DETAILED DESCRIPTION

Figure 1:
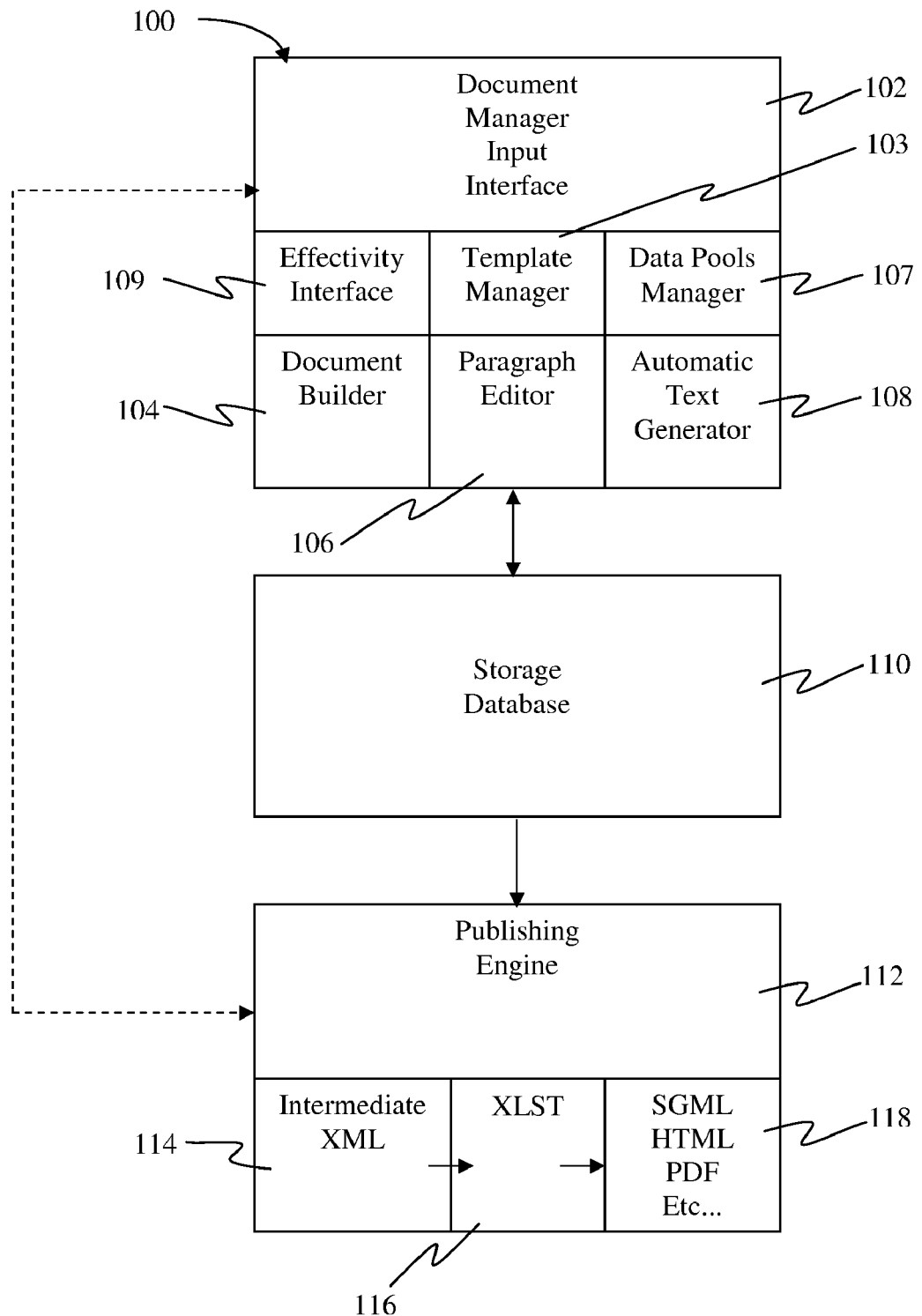
FIG. 1 is a block diagram illustrating an automatic authoring and publishing system 100 according to one embodiment of the invention.

Methods and devices that implement the embodiments of the various features of the invention will now be described with reference to the drawings. The drawings and the associated descriptions are provided to illustrate embodiments of the invention and not to limit the scope of the invention. Throughout the drawings, reference numbers are re-used to indicate correspondence between referenced elements. In addition, the first digit of each reference number indicates the figure where the element first appears. The following description is provided to enable a person skilled in the art to make and use the invention and sets forth the best modes contemplated by the inventor, but does not limit the variations available.

In the following description, certain terminology is used to describe certain features of one or more embodiments of the invention. The term "document" refers to any form or display that is readable including manuals, manuscripts, web pages, Adobe PDF documents or other form capable of being read. The term "storage device" refers to any device capable of storing information, including hard drives, dynamic random access memory (DRAM). The term "data element" refers to any quantum of data packaged as a single item. The term "data unit" refers to a collection of data elements and/or data units that comprise a logical section. The term "storage database" includes any mechanism that provides (i.e., stores and/or transmits) information in a form readable by a machine (e.g., a computer). The term "effectivity" denotes a method where a function or a component is applied to a specific document and propagated to all other documents that contain the function or the component. The term "storage medium" may represent one or more devices for storing data, including read-only memory (ROM), random access memory (RAM), magnetic disk storage mediums, optical storage mediums, flash memory devices and/or other machine readable mediums for storing information. The term "machine readable medium" includes, but is not limited to portable or fixed storage devices, optical storage devices, and various other mediums capable of storing, containing or carrying instruction(s) and/or data.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function.

Various embodiments provide a system, method and device for an automatic authoring and publishing system. One embodiment of the present invention assists users in automatically generating content and publishing technical manuals for large-scale, complex products and services for building, maintaining, servicing, and/or retrofitting aircraft.

One feature provides a guided or structured software environment that assists users in creating manuals by defining the appropriate data structures and content for each manual section, content rules and relationships, and tasks to be performed for each type of manual entry. Predefined templates and data structures are used to facilitate the creation of data elements and compile a final manual.

Another feature provides for storing the manual content as structured data elements, rather than as sentences or paragraphs, to more efficiently generate, revise, and store the content of a manual. That is, rather than storing content as complete pages of text (e.g., sentences, paragraphs), tables, and/or graphics, the present invention stores the content as distinct data elements in a database. This also allows different manuals to be compiled using some of the same data elements, thereby saving storage space. Moreover, this approach to storage of content permits a single data element to be modified to propagate that modification to all other manuals referencing that data element.

Yet another novel feature provides an instant preview mode that permits an author to quickly view what revisions will look like in a final document prior to actually publishing the manual. A publishing engine publishes the manual by assembling the stored data elements and compiling them into a single document.

A compiled document may be converted into an XML document and forwarded to an Extensible Stylesheet Language Transformation (XSLT) where it is output in a user selected format. While several of the examples described herein relate to aircraft service or maintenance manuals, it should be understood that the various features of the present invention may be implemented in a wide array of document creation processes for various purposes, products, and/or systems besides aircraft.

FIG. 1 is a block diagram illustrating an automatic authoring and publishing system 100 according to one embodiment of the invention. The automatic authoring and publishing system 100 includes a document manager input interface 102, a storage database 110, and a publishing engine 112. In various implementation, these components of the authoring and publishing system 100 may be separate or integrated software modules that operate to guide a user in authoring a manual, defining data structure and allowable content, storing content as distinct data elements, providing a quick preview of content prior to full publication, and tracking changes from one revision to the next.

The document manager input interface 102 may include a template manager 103, document builder 104, a paragraph editor 106, data pools manager 107, effectivity interface 109, and an automatic text generator 108.

Figure 2:
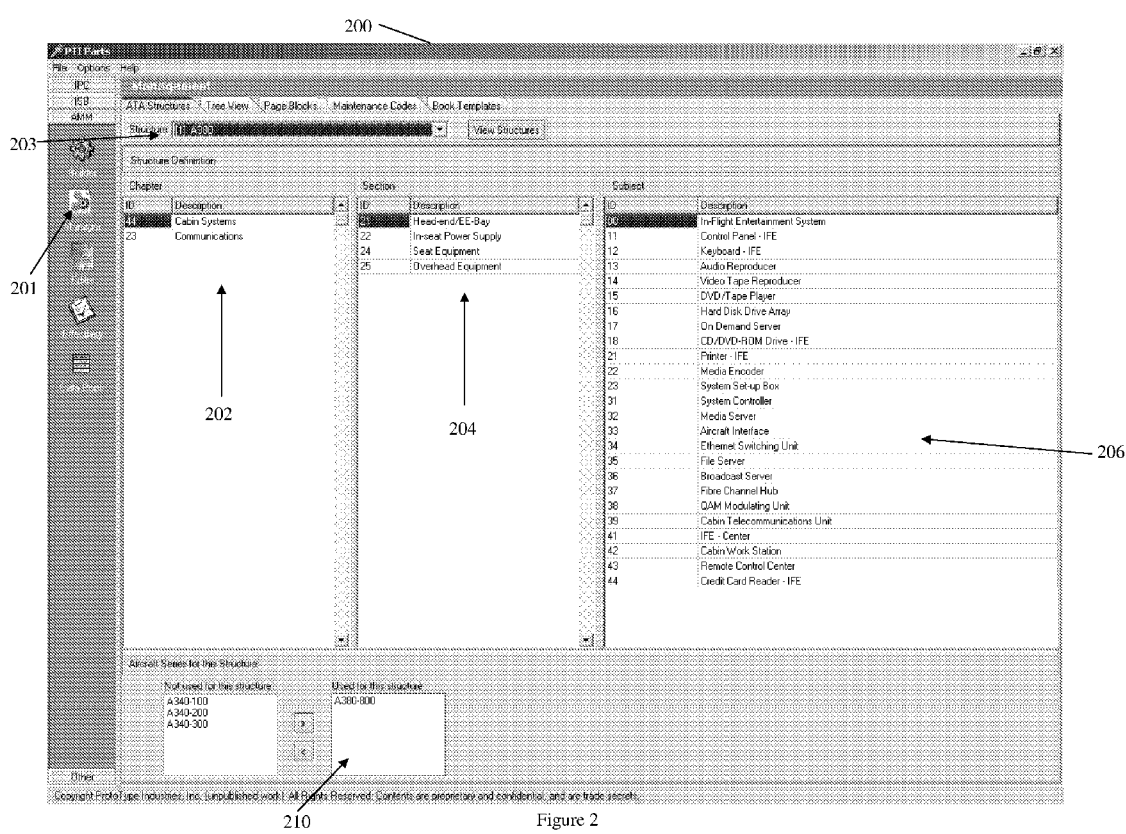
FIG. 2 illustrates an example of a user interface in which a template manager component has been selected.

104 enables a user to graphically build a template defining specific aircraft models/types to which it applies and a parts library and relevant section(s) of the manual. The template manager 104 allows a user to manage defined data structures, create templates, and manage task-oriented function codes. The data structures may be defined by the user or a regulatory body, such as the Air Transport Association (ATA), for aircraft systems. In this example a data structure may be identified by a 6-digit number (defined by the ATA and/or aircraft manufacturer) in the form of XX-YY-ZZ (e.g., Chapter-Section-Subject) that permits standardization of manual components across an industry. The Air Transport Association (ATA) regulates and has clearly defined the first three digits of the 6-digit ATA solution in iSpec2200. The last three digits are regulated by the Original Equipment Manufacturer (OEM) (e.g., aircraft manufacturer). The template manager 103 may load a set of default data structures that the user may customize or the user may create new structures to use on a manual. FIG. 2 illustrates a user interface 200 where the template manager module 201 has been selected. For a selected manual template structure 203, the user interface 200 shows the various chapters 202, sections 204, and subjects 206 available in the selected template 203. Here a user may add or delete a chapter 202, section 204, or subject 206. This interface 200 also allows a user to define which aircraft series 210 is associated with a given structure. Similarly, a user may add, delete, or edit page blocks (e.g., standard page blocks that a user can define for each book type), maintenance function codes (e.g., a hierarchical tree structure of defining tasks and subtasks), and/or book templates (e.g., one or more document templates making up a particular manual). In this manner, a document template is defined with a particular data structure, specific set of rules and content applicable to the selected data structures, and a predefined corresponding parts library.

The builder module 104 allows a user to create a new book (manual) from one or more defined templates and/or create a revised book based on a previous version of the book (manual).

Figure 3:
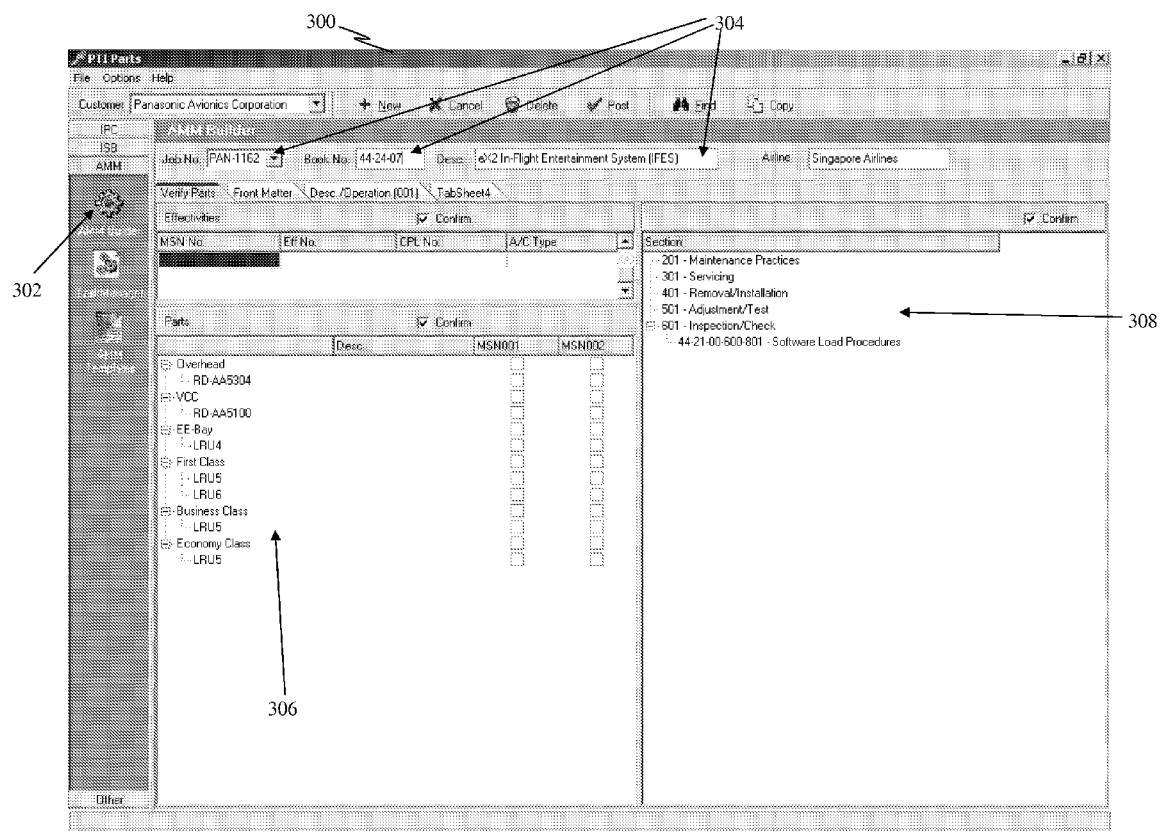
FIG. 3 illustrates an example of a user interface in which a manual builder component has been selected.

Having defined a particular template or previous revision of a book, the user may select and edit one or more parts and sections from a plurality of manual parts and their corresponding sections. For example, FIG. 3 illustrates an example of a user interface 300 in which a manual builder component 302 has been selected. The manual builder component 302 includes a manual definition section 304 (e.g., Job No., Book No., Description, etc.) that defines the book (manual) to which the template belongs. A parts library list 306 allows a user to define the parts to be listed by the template. A list of predefined sections 306 (e.g., Maintenance, Servicing, Removal/Installation, Adjustments/Tests, Inspection/Check) are also available from which the author chooses the manual section to which template corresponds. Each section 308 may have sub-sections, in a tree-like structure, from which an author can choose and which more precisely define a particular manual component. In this manner, a template is defined from a set of predefined and structured sections 308 and parts libraries 306.

Figure 4:
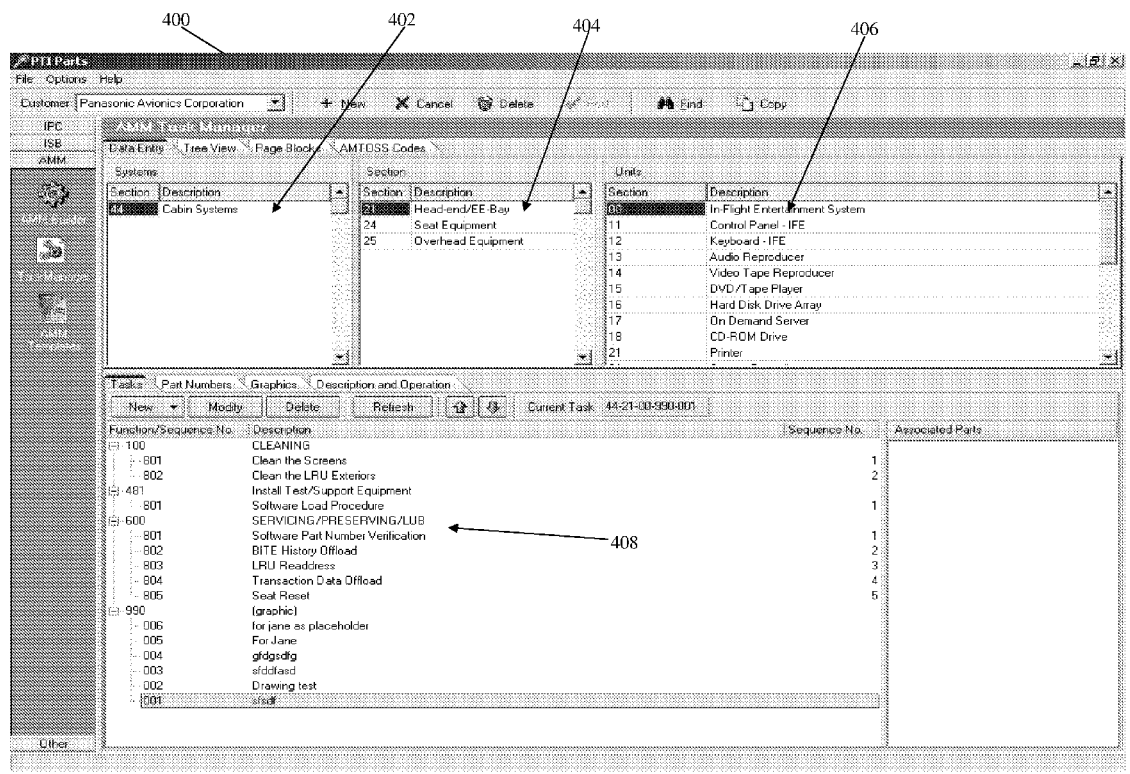
FIG. 4 illustrates a task interface that a user may use to define one or more tasks to be carried out in servicing a particular system.

As previously noted, a manual template may further define the type of content for the manual. For instance, one or more tasks for each defined manual section may be defined from a predefined set of tasks provided by the document manager input interface 102. The selected manual sections and tasks may be organized as tree-like data structures data that are identified with the defined template. The tasks may define the general steps needed to accomplish the goal of a particular manual section. For example, FIG. 4 illustrates a task interface 400 that a user may use within the document builder 104 to define one or more tasks to be carried out in servicing a particular system. For instance, for a selected cabin system 402, an associated section 404 may be selected. For each section 404 one or more associated units or components 406 may be selected by the user to define the document template. For a particular component 406, a user may define which tasks or functions 408, from a predefined list of tasks, should be performed. In this manner, the document template defines a tree-like structure of data-types and general tasks for a particular system 402, section 404, and unit 406.

Once a document template has been defined, it can be stored in a database that permits an author to then fill-in the document template according to data structure, rules, and conditions imposed by the template. Once the document has been filled by an author and validated, it can then become part of a new manual revision.

Figure 5:
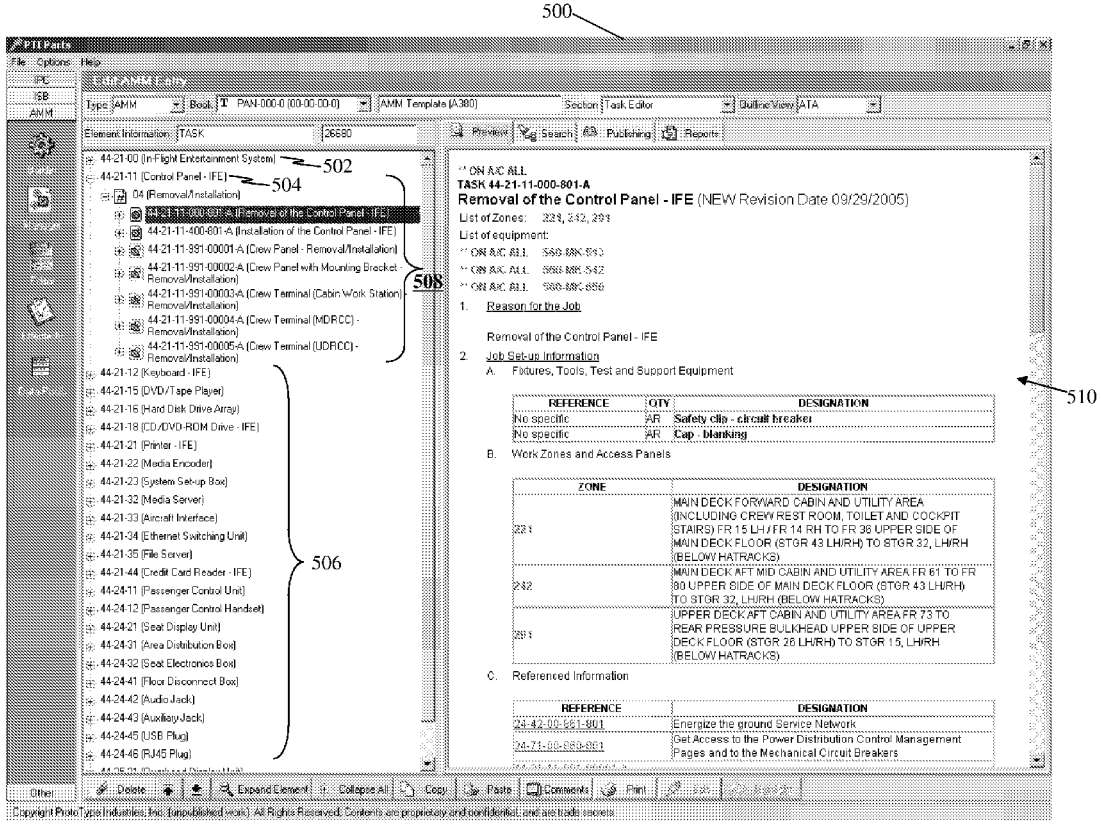
FIG. 5 illustrates a document editor interface that an author can use to open a document template and add content to the document template guided by the structure and rules of the document template to generate a manual.

The document editor module 106 allows an author to finalize the content of a document template to generate a manual or part of a manual. The document editor module 106 allows a user to add, delete, and modify the content and structure of a selected book (manual). The document editor module 106 may include a dynamically generated menu system based on the content structure, rules, and/or conditions specified in the document template being used. Such menu system may be selected based on a book type, book number, and section of the book. That is, the document editor module 106 retrieves the data structure, rules, and conditions defined by the document template (for the book type, book number, and section) and generates one or more menus that guide the author and facilitates generating the manual's contents (e.g., removal, maintenance, installation, instructions or steps). For example, FIG. 5 illustrates a document editor interface 500 that an author can use to open a document template and add content to the document template guided by the structure and rules of the document template to generate a manual. For a defined system (e.g., the In-Flight Entertainment (IFE) System 502), various components 504 and 506 (e.g., Control Panel IFE, Keyboard IFE, DVD/Tape Player, etc.) may be defined in a tree-like structure. For each component 504 and 506, a document template may define one or more tasks and sub-tasks 508. Thus, an author is guided by the data structure of the document template to the predefined components and tasks. As a result, the author need not be an expert in the system or components but merely follow the defined data structure and rules imposed by the document template. The tree-like structure of system components and tasks may be predefined or imposed by a standard. A preview pane 510 also shows the content of the selected task page.

Figure 6:
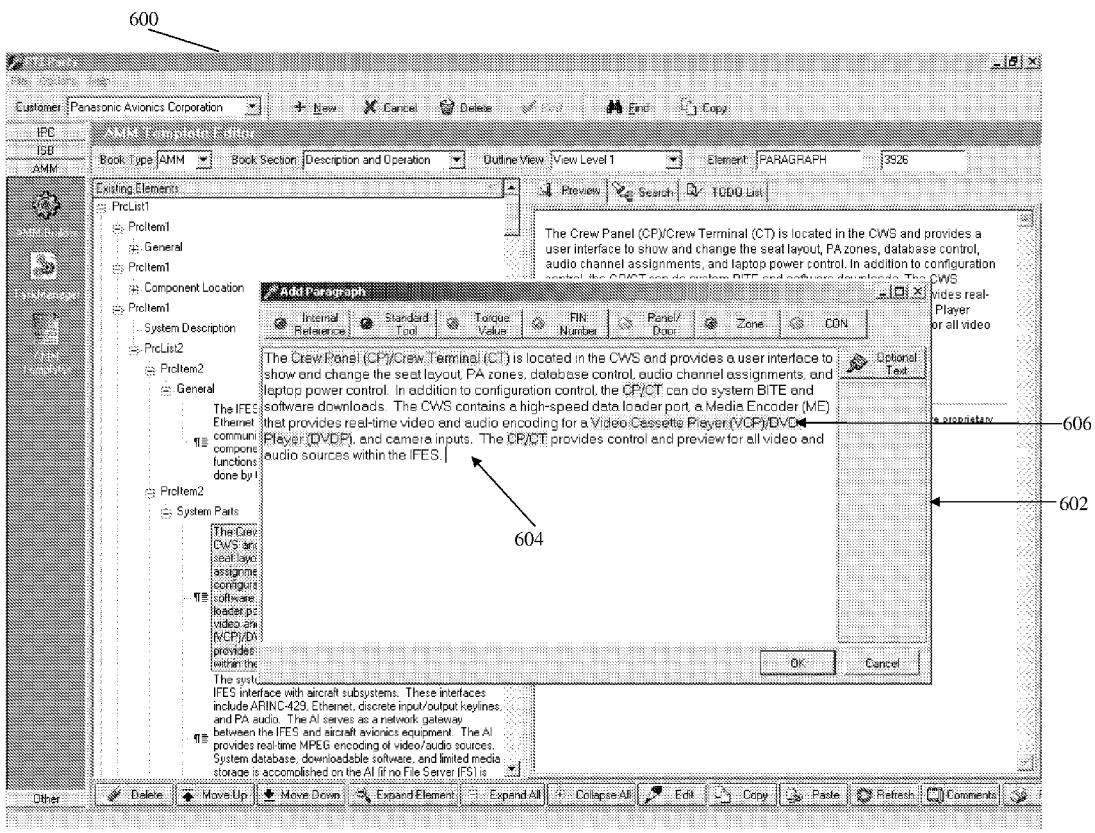
FIGS. 6 and 7 illustrate a document editor interface in which the author is editing or customizing a particular component and task on a paragraph editor interface and previewing such changes.
Figure 7:
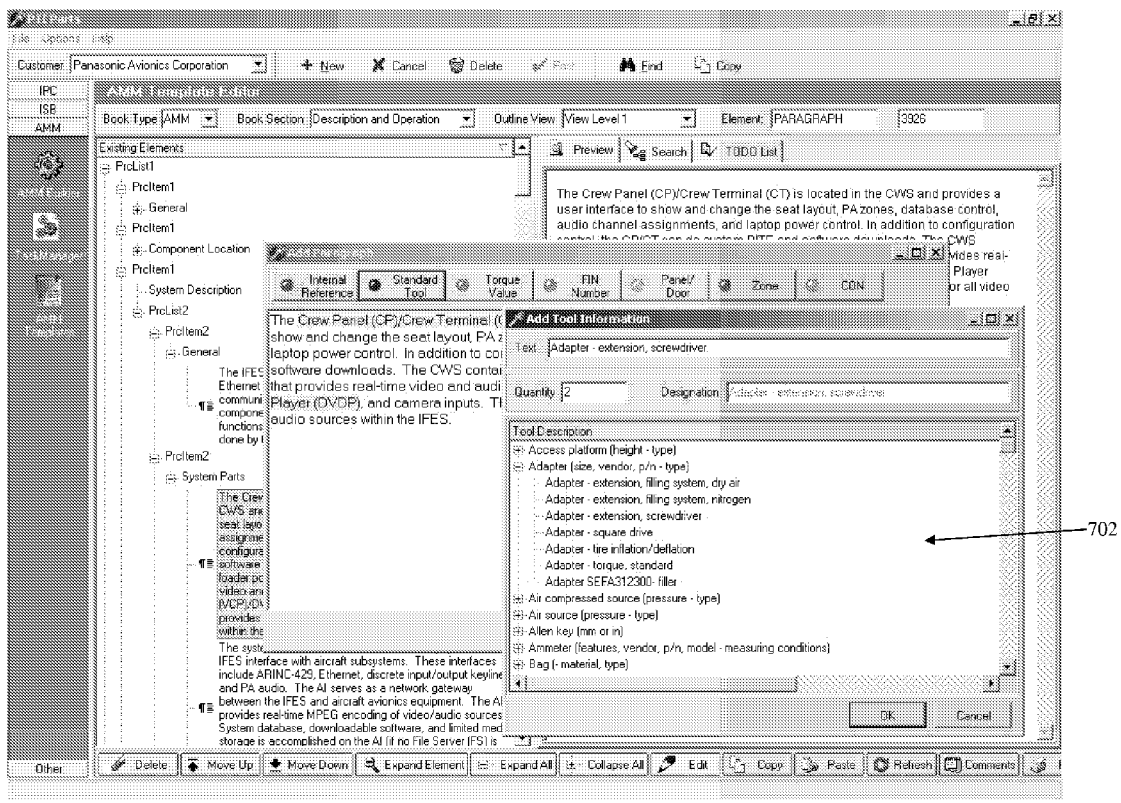

From the document editor module 106, an author may select a task to edit and/or revise. For example, FIG. 6 illustrates a document editor interface 600 in which the author is editing or customizing a particular component and task on a paragraph editor interface 602. The paragraph 604 may be predefined in the document template with customizable text or data field 606. These customizable text or data field 606 may be edited by the user by selecting the customizable portion 606 and selecting from a predetermined list of tools or options 702 (FIG. 7). This list of tools or options 702 may be generated based on the definitions of the document template being used. In this manner, the user is guided in editing or customizing the manual content by menus and content predefined in the document template. The customizable text or data field 606 may appear as a highlighted As illustrated in FIG. 5, a preview pane 510 shows how modified components or tasks may be quickly previewed prior to full publication of a manual or document. The preview pane 510 shows an HTML (Web page) representation of the content of the selected node (data structure element) with an applied style sheet. A User can double-click most items in the preview to launch the editing form for that element. Paragraphs, notes, warnings, cautions, and tables can be edited directly by double-clicking the element in the Preview. This prevents the user from having to navigate through the tree structure in the document editor interface 500. This preview pane 510 allows a user to see a particular document section as it would appear in a hard copy or web page with stylized numbering and formatting. The preview pane 510 also shows content that cannot be seen in the editing pane, therefore it adds flexibility to the authoring tool. For example, the content of any table can be seen as a formatted table in the preview pane 510 whereas it only appears as an icon in the tree of the editor pane. The content of the preview pane 510 may also be color-coded for the user to easily identify special elements, highlighting, aircraft effectivity, etc.

One aspect of the invention introduces the concept of "effectivity" in which particular components or tasks are associated with one or more types of aircraft and this association is propagated to documents cross referenced or hyperlinked to the particular tasks or system components. An effectivity interface 109 may be provided to enable a user to establish effectivity associations or relationships. Once associated, the particular task or system component is propagated to all other related documents that contain the same types of aircraft. The concept of effectivity guarantees the propagation of application-specific or model specific information throughout a manual so that all applications or models covered by a particular manual are accurately supported. For example, if bolts used in affixing an overhead compartment to the fuselage of an aircraft are replaced by an improved fastener, the data element representing the bolt is replaced with a new individual element representing the new fastener. The system propagates the effectivity of this change to the documents that contain the bolt and automatically updates the documents. The notion of an aircraft range may be used to gather aircrafts sharing the same properties and associate them with data structures or elements corresponding to said properties. These ranges may be defined in accordance with the customers (airlines). Overlaps in effectivity statements are not allowed for variant data structures or elements. Thus, one or more data structures or elements are associated with a particular aircraft or aircraft type. This effectivity can be used to make sure that all associated elements for a particular aircraft have been included in a particular manual.

In one embodiment, the document manager input interface 102 may also incorporate an automatic text generator 108 that allows the deconstruction of the syntax of textual data elements from the tree-like data structure of a document template. The textual data elements are syntactically joined with the appropriate linguistic rules prior to outputting a document or manual. The automatic text generator 108 can generate one or more manual tasks, such as assembly instructions, disassembly instructions, test procedures, cleaning procedures, repair procedures, inspection procedures, operation procedures, or other required text, within the automatic text generator's 108 lexical capabilities. One implementation of the automatic text generator 108 is disclosed in U.S. patent application Ser. No. 10/887,162 a System and Method for Generating Text by Grigoriadis et al., which is hereby incorporated by reference in its entirety.

The user specifies a category to place the business rule and defines a task for the category. The business rule can then be applied to a chapter, a section or a subject of the current document. For example, if an aircraft is to be manufactured for a specific airline and the audio system is the same across the ordered models; the user would create a business rule to reflect the audio system and place it in the sound system category and assign the task of installation to the rule. The business rule would be applied to the documents related to specific airline. The document manager input interface 102 interacts with the user to select options and allows the user to select a document template to construct a document, create an entirely new document, edit an existing document, or automatically generate a document.

Another feature provides data pools manager 107 that allows a user to manage standard data structure types. The data pools manager 107 allows a user to add, delete, and/or modify data that is standard in particular data structures, thus customizing them for particular applications.

The storage database 110 is a repository for document data elements that can include text, graphics, illustrations and other items that can be reused in other documents or are unique to specific documents. In another embodiment, the data elements comprise diagrams, procedures for operation, maintenance, and cleaning of the unit or a list of tools required to perform a task. In yet another embodiment, the data elements comprise price, quantity, availability and reordering data.

A publishing engine 112 is also provided comprising an intermediate extensible markup language (XML) generator 114, an extensible language stylesheet transform (XLST) application 116, and the final document output format 118. In one embodiment, the publishing engine 112 uses XML 114 as an intermediate step prior to publishing. The user selects an XSLT 108 from the document manager input interface 102 to transform the intermediate XML file into the desired final output format 118. In another embodiment, the final output format 118 is based on the Standard Generalized Markup Language (SGML). SGML is an ISO standard: ISO 8879: 1986 information processing language. SGML allows the writer to be focused on the structural aspects of a document and leave the visual presentation of that structure to the publishing engine 112. In other embodiments the document output can be in any format, for example, such as HTML, PDF or plain text.

Figure 8:
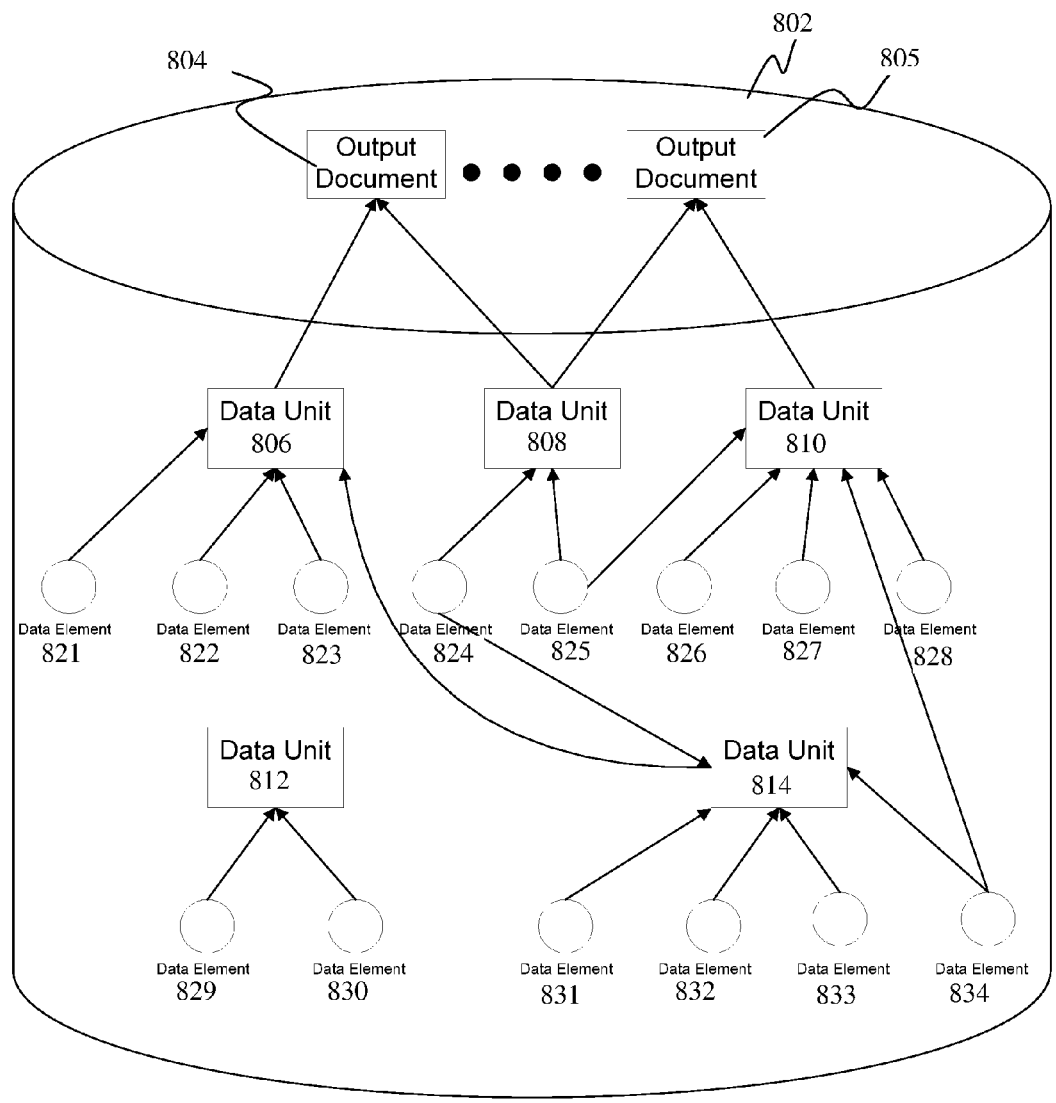
FIG. 8 is a block diagram illustrating the data structure of a relational storage database according to one embodiment of the invention.

FIG. 8 is a block diagram illustrating the data structure of a relational storage database 202 according to one embodiment of the invention. Output documents 804 and 805 are compiled from data elements 821-834 that define content in a bottom up approach. Data units 806-810 may be composed of one or more data elements 821-834 or data units 812 and 814. A single data element 824 may be used in multiple data units 808 and 814. Additionally, a first data unit 814 may be used as part of a second data unit 806. The links between data elements 821-834 are dynamically created as data is structured and the data elements 821-834 can be used in multiple different output documents 804 and 805 or manuals. A modification to a data element 824 or a data unit 814 automatically updates the output documents 804 and 805 that have the data element 824, or the data unit 814 contained within them, obviating the need to manually or individually update the output documents 804 and 805. Data elements 814-834 may contain manual or document content, content attributes, rules and/or conditions as distinct components of a data structure or unit. For example data element 822 may contain a chart or graphic while data element 823 contains a maintenance procedure.

One feature provides a revision history of data elements 821-834 and/or output documents 804 and 805 so that prior versions of the output documents 804-805 can be reproduced. In another embodiment, data elements 821-834 contain security levels that restrict user access to modify the data elements 821-834.

In some embodiments, a document editor is configured to place a data element 821-834 in a tree-like structure. The user can modify the tree-like structure, add content to the elements in the tree-like structure, and/or display a preview of a modification to the tree-like structure. For example, a user can move a document data element 821-834 from an existing tree-like structure to another tree-like structure (i.e. cut and paste the document data element 821-834), or copy a part or the entire tree-like structure into a new or existing document. User modifications to the tree-like structure operations need not affect the document data elements 821-834, only the structure or relationship of the document data elements within the tree-like structures. In one embodiment, the document data elements 821-834 are selected from the group consisting of one or more text, quantity, descriptions, procedures and graphical metadata.

In one embodiment, the publishing engine for producing output from the system is configured to gather document data elements 821-834 and place them in a predetermined form according, for example, to a document template. The publishing engine may add images to the predetermined form, for example, a maintenance troubleshooting flowchart.

Figure 9:
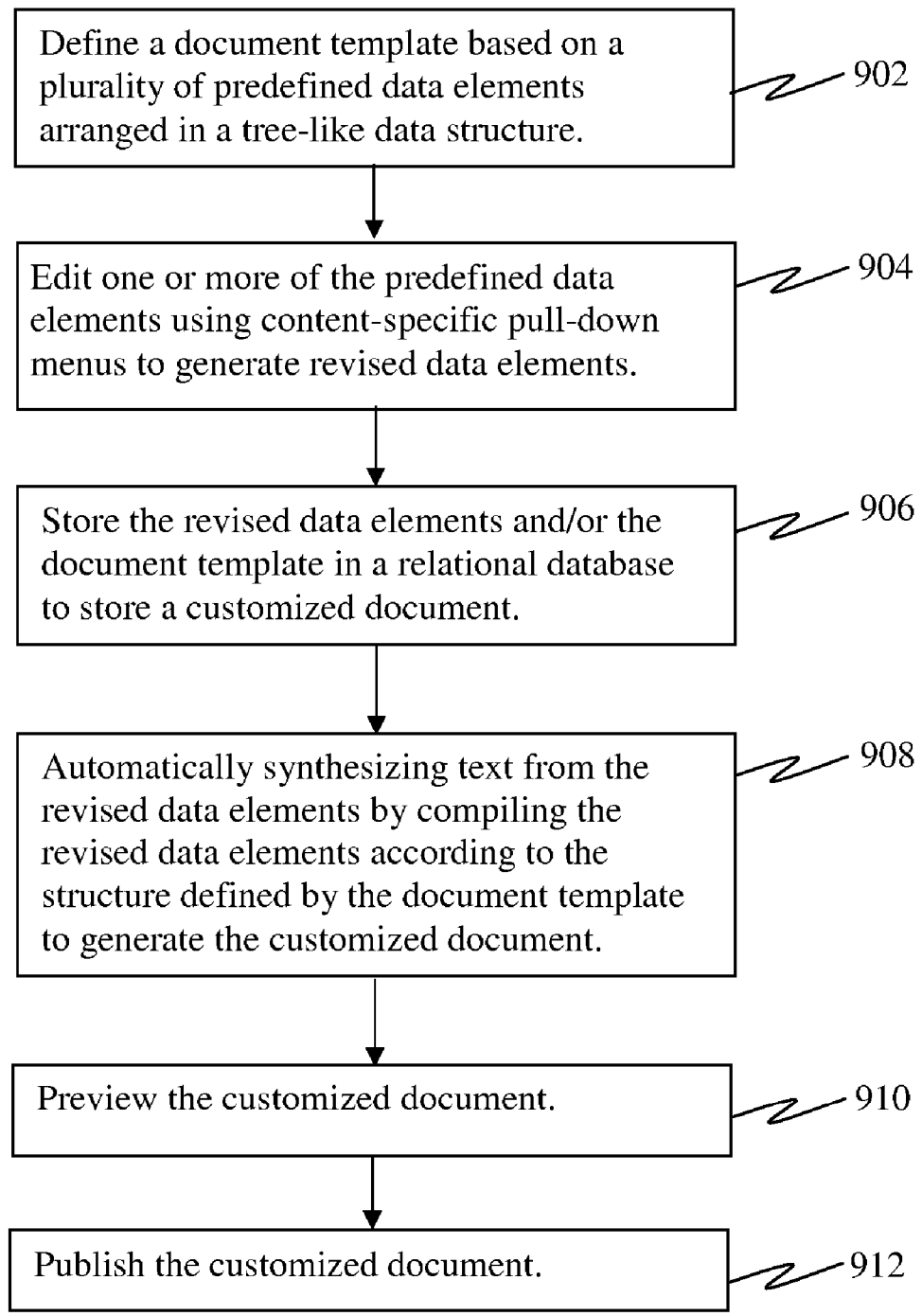
FIG. 9 illustrates a method for authoring a manual using a guided and structured document generation system according to one embodiment of the invention.

FIG. 9 illustrates a method for authoring a manual using a guided and structured document generation system according to one embodiment of the invention. A document template is defined based on a plurality of predefined data elements arranged in a tree-like data structure 902. One or more of the predefined data elements are edited using content-specific pull-down menus to generate revised data elements 904. The revised data elements and/or the document template is stored in a relational database to store a customized document 906. Text from the revised data elements is automatically synthesized by compiling the revised data elements according to the structure defined by the document template to generate the customized document 908. The customized document may be previewed 910 prior to publishing 912.

Figure 10:
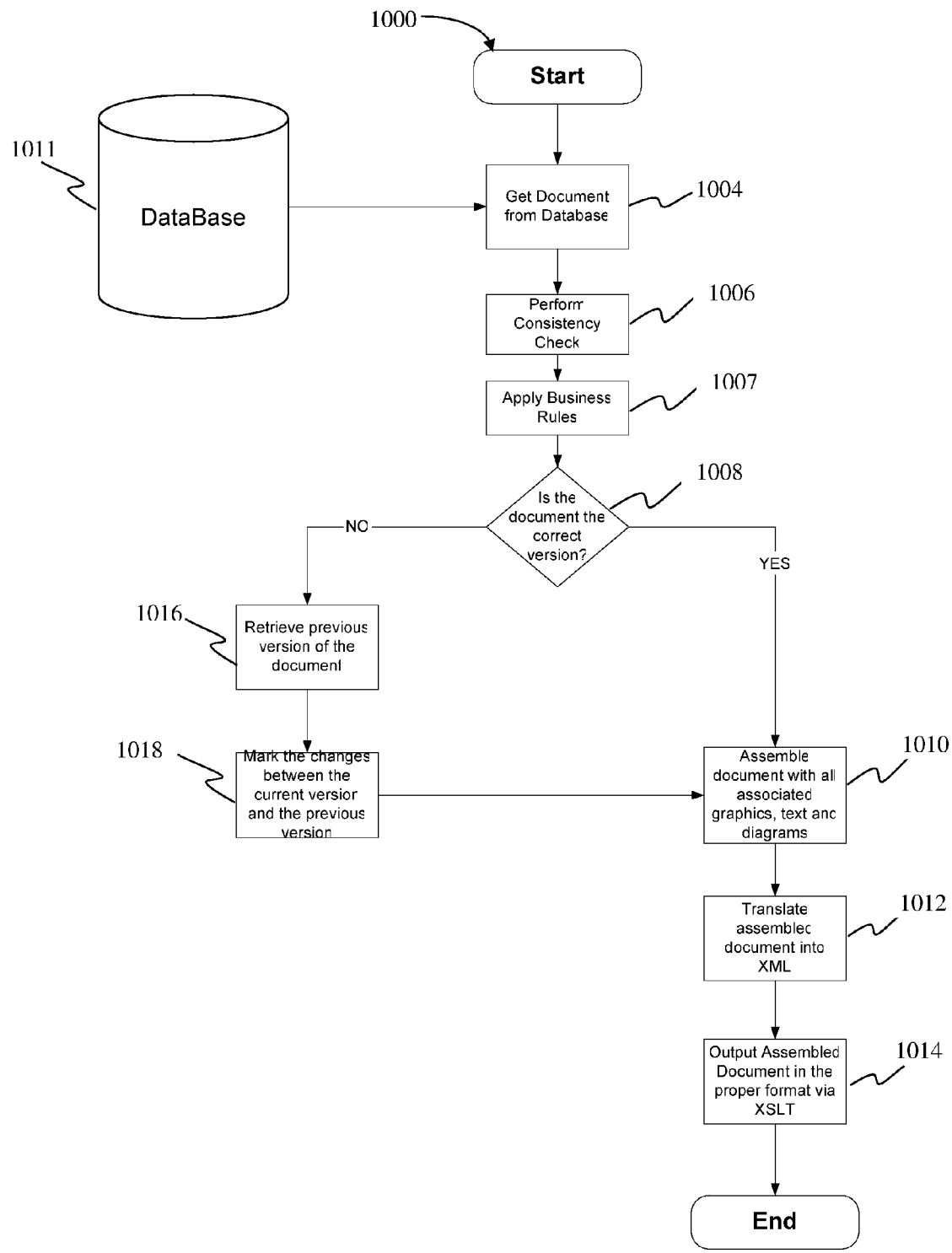
FIG. 10 illustrates a method for operating a publishing engine according to one embodiment of the invention.

FIG. 10 illustrates a method for operating a publishing engine according to one embodiment of the invention. One or more finalized documents 1004 are retrieved from the database 1011. A consistency check 1006 is performed to insure that the document has all the data elements 821-834 needed or defined by the document template. Business rules 1007 selected by the user or defined in the document template are then applied. For example, if the user selects a business rule for an upgraded audio-visual system to be installed in an aircraft, the corresponding parts, technical specifications, technical manuals, maintenance manuals, etc., are incorporated into the document in place of the standard audio-visual system. The document is then checked to determine if it is the correct version 1008 to be published. If the document is not the correct version to be published, the previous version of the document 1016 is retrieved and changes between the current version and the previous version 1018 of the documents are marked. For example, when the user selects an upgraded audio-visual system for publication, the differences between the documentation with the standard audio-visual system and the upgraded audio-visual system are marked so that the upgraded system is used in the documentation in place of the standard system. The document is then assembled with all associated graphics, text and diagrams 1010, then translated into an intermediate XML 1012 version, and outputted in a user selected format by an XSLT 1014.

Figure 11:
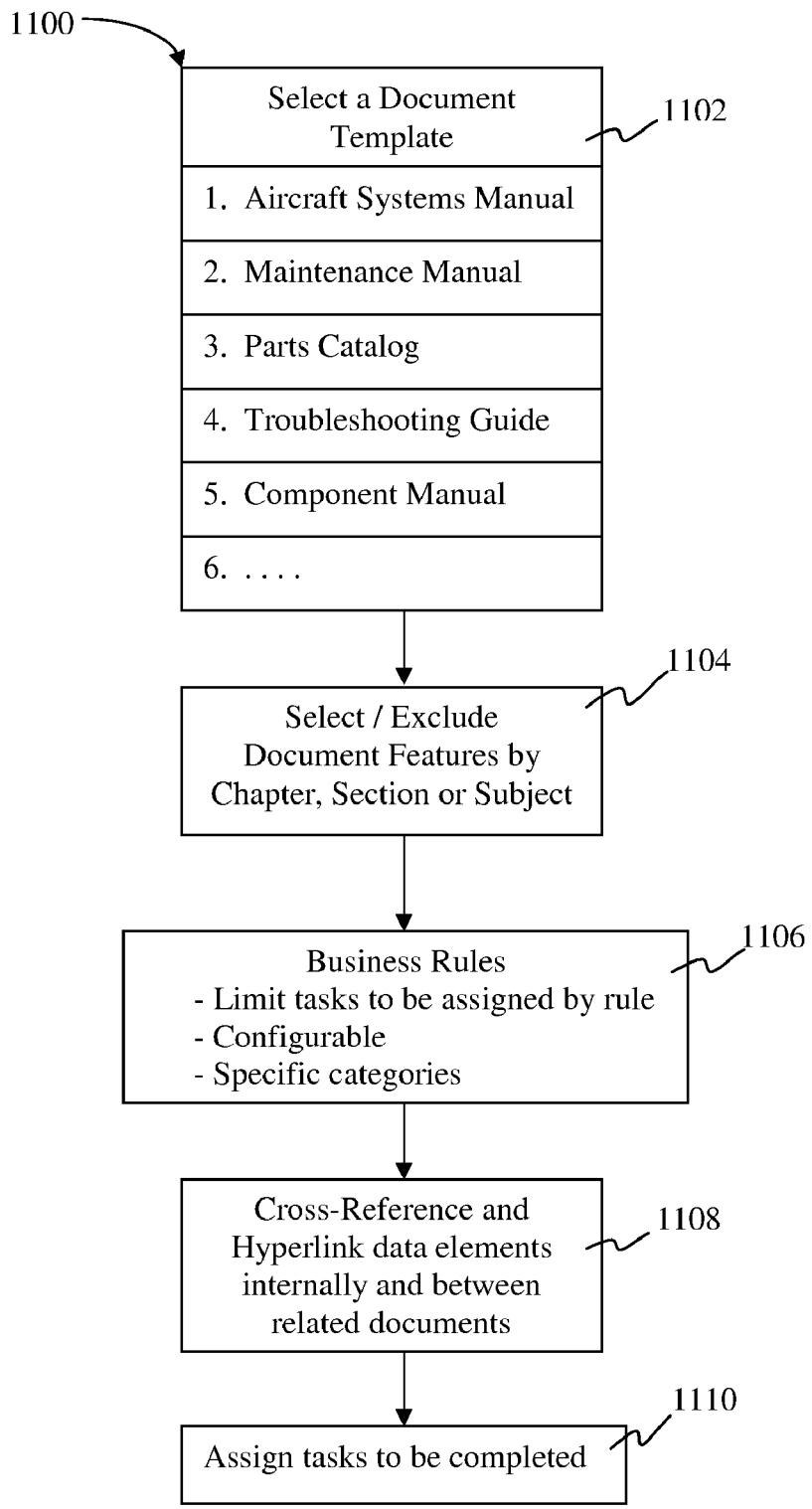
FIG. 11 illustrates a method for authoring a document using the automatic authoring and publishing system according to one embodiment of the invention.

FIG. 11 illustrates a method for authoring a document using the automatic authoring and publishing system according to one embodiment of the invention. A document template for a particular document, such as an aircraft system manual, a maintenance manual, a parts catalog, a troubleshooting guide or a component manual, is selected 1102. In other embodiments the list of available document templates can be related to the final documents to be output from the system, the government/industry standards for documents, or by client design. Document template features 1104 (i.e. charts, diagrams, procedures, text, etc.) may be selected or excluded from the document being authored by the user. These features may be selected or excluded on various levels of the document including by the chapter, section, and/or subject. Business rules 1106 may be applied to the document to limit the tasks that can be assigned to a user. The business rules 1106 may be configured by the user to adapt to the specific needs of the final document. For example, a standard business rule for adding audio capabilities to an aircraft may be modified to limit the audio to only the first class section of the aircraft. Business rules 1106 can be assigned to specific categories to facilitate their use. For example, business rules relating to the audio systems on an aircraft can be categorized under "Audio," and the food service business rules can be categorized under "Food." Various data elements may also be cross-referenced and/or hyperlinked internally and between related documents 1108. This permits storing content as structured data elements rather than as a single document. A set of tasks are then defined to be completed by an author in order to finalize or complete a document or manual. This may include customizing a document template for a particular type of aircraft or operation. Thus, document templates and corresponding data structures are formed according to this method.

Figure 12:
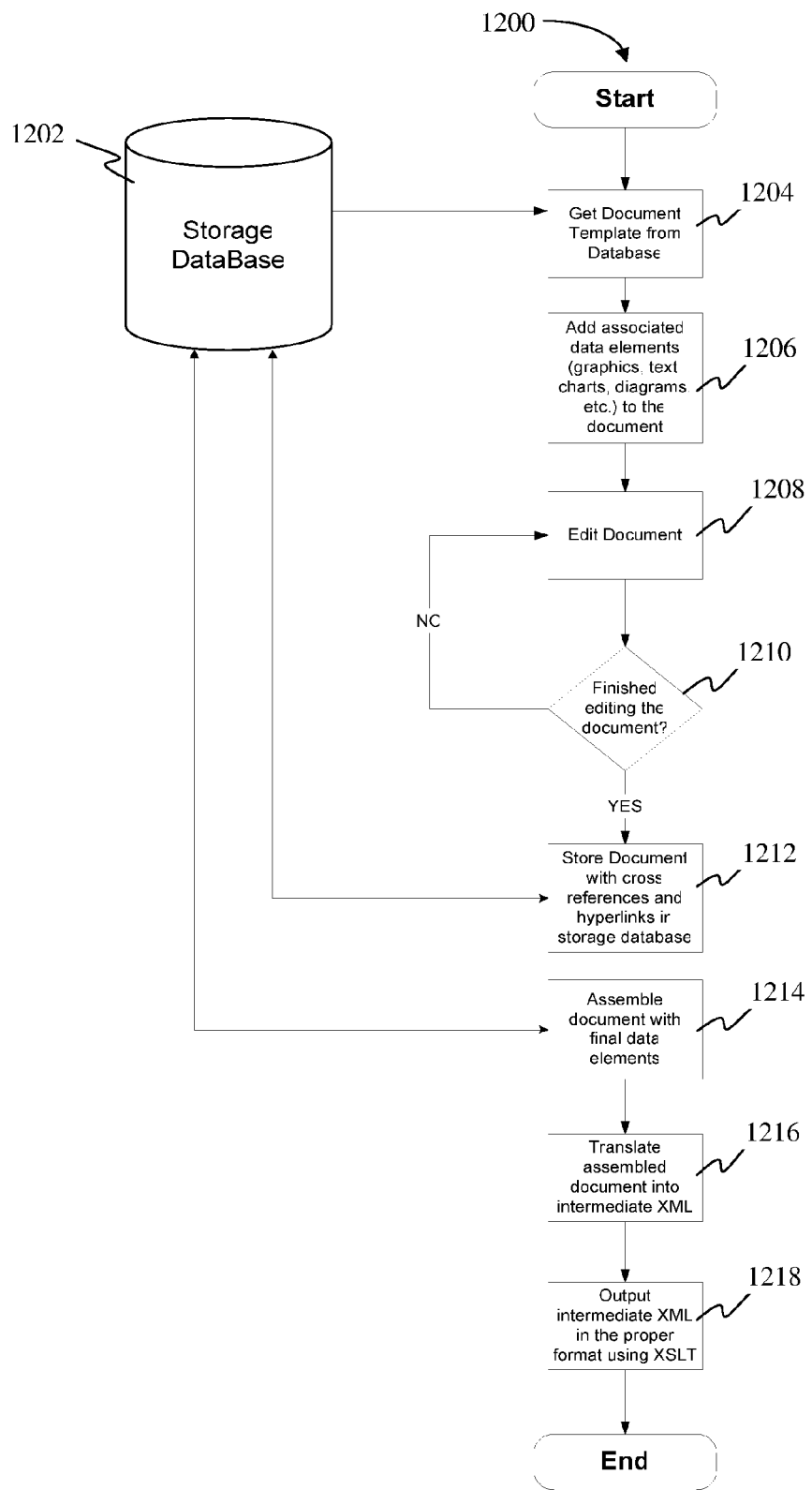
FIG. 12 illustrates a method for authoring and generating a document according to one embodiment of the invention.

FIG. 12 illustrates a method for authoring and generating a document according to one embodiment of the invention. A document template is retrieved from the storage database 1202. The associated data elements (i.e., graphics, text, charts, diagrams, etc.) defined by the document template from the storage database may be added 1206 to the compiled final document 1202. The user may edit the document 1208 by customizing data elements to conform to an industry specification or a client requirement until the document is complete 1210. The document is stored 1212 in the storage database 1202 with cross references and hyperlinks to common data elements. A compiled document is assembled 1214 with the data elements translated into an intermediate XML format 1216. The intermediate XML formatted document is output in the format specified by the user by way of an XSLT 1218.

Figure 13:
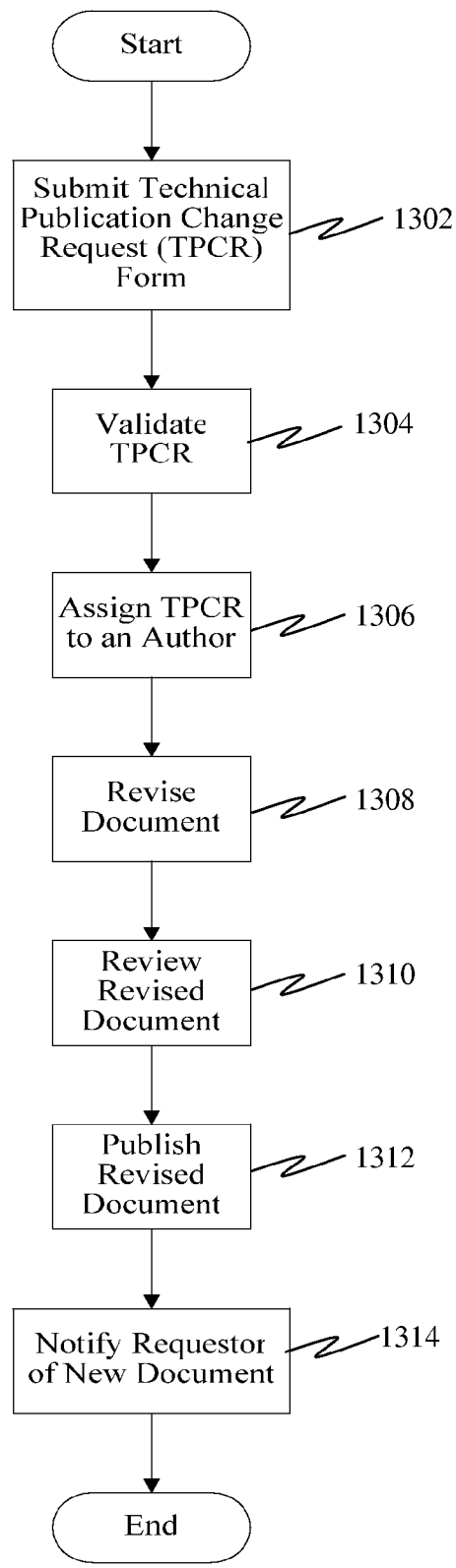
FIG. 13 illustrates a method for processing an internet-based client document change request application according to one embodiment of the invention.

FIG. 13 illustrates a method for processing an internet-based client document change request application according to one embodiment of the invention. A technical publication change request form is submitted by a client 1302. The submitted technical publication change request form is automatically sent to a reviewer for validation 1304. For example, certain fields may be required to be completed before the request can be assigned, or the submission is returned to the requester with a request for the missing information. The submitted technical publication change request is assigned to an author 1306 to revise 1308 the document. The revised document is reviewed 1310 for errors and is then sent for independent review to insure accuracy prior to being published 1312. For example, if the technical change request involves an engineering change to an aircraft, a certified aircraft engineer may review the documentation change to insure the accuracy of the revision. A response is sent to the requester that action has been taken on the submitted technical publication change request and that the updated document is available 1314.

Another embodiment provides an apparatus comprising a machine readable medium containing instructions that, when executed, cause the machine to perform operations of loading a predefined document template. Parts of the predefined document template can then be selected or excluded from the document. Individual document elements are retrieved from a storage database. Individual document elements are inserted into the predefined document template. Text is automatically generated and inserted into the predefined document template. The predefined document template and the individual document elements are stored together as a new document in the storage database. An output format for the new document is selected. The new document is then encoded as an extensible markup language file. The extensible markup language file is converted to the output format selected by the user using an extensible stylesheet language transform. The new document is then published in the output format selected.

What has been described is a new and improved system and method for automatically authoring and publication of documents overcoming the limitations and disadvantages inherent in the related art. Although the present invention has been described with a degree of particularity, it is understood that the present disclosure has been made by way of example. For example, the present invention is not limited to aircraft manuals but may be implemented with any other products (e.g., cars, boats, electronics, etc.) where manual are needed. Since various changes could be made in the above description without departing from the scope of the invention, it is intended that all matter contained in the above description or shown in the accompanying drawings shall be illustrative and not used in a limiting sense.

What is claimed:

1. A method of generating a customized document about a product, the product comprising a plurality of components, the method comprising:
   a) providing a user with a document manager input interface on a computer, the input interface including a template manager module, a data pools manager module, an automatic text generator module, a document editor module, an effectivity interface module, and a document builder module;
   b) on the computer, defining a template based on a plurality of predefined data elements arranged in a tree-like data structure using the template manager module, the predefined data elements being retrieved from a parts library contained in the document builder module and defining parts and sections to be listed in the template;
   c) on the computer, creating the customized document from the defined template using the document builder module;
   d) on the computer, editing the customized document using the document editor module by using content-specific pull-down menus on the computer to edit one or more of the predefined data elements and thereby generating revised data elements and storing the revised data elements in a relational database storing the customized document;
   e) on the computer, deconstructing the syntax of textual data elements that are syntactically joined with linguistic rules, specifying a category in which to place a business rule, generating one or more tasks associated with a business rule and applying the business rule to the textual data elements of the document using the automatic text generator module;
   f) on the computer, modifying data that is standard in particular data structures and customizing the data for particular applications using a data pools manager module;
   g) on the computer, establishing effectivity associations, using the effectivity interface module, for a given component of the product, defining the manner in which a change to a given component is propagated throughout the customized document;
   h) in response to a user making the change to the given component via the effectivity interface module, propagating the change throughout the customized document according to the effectivity associations established by the user;

i) synthesizing text from the revised data elements according to the (i) the structure defined be the template manager module, (ii) the edits made using the document editor module; (iii) the business rule applied by the user using the automatic text generator module, (iv) the customization data provided by the data pools manager module, and (v) the effectivity associations established by the user; and j) generating and publishing the customized document.

2. The method of claim 1 further comprising:
tracking an effectivity in the customized document to track one of the predefined data element or revised data element across multiple other documents.

3. The method of claim 1, where the plurality of predefined data elements are selected from the group consisting of text, quantity, descriptions, procedures and graphical metadata.

4. The method of claim 1, further comprising:
cross-referencing one of the predefined data elements or revised data elements to one or more other documents.

5. The method of claim 1 further comprising:
dynamically generating the content-specific pull-down menus based on a defined content type of the document template.

6. The method of claim 1 further comprising:
previewing the customized document prior to publishing.

7. The method of claim 1, wherein publishing the customized document comprises:
converting the customized document into an extensible markup language document;
forwarding the extensible markup language document to an extensible stylesheet transform; and
outputting the extensible markup language document from the extensible stylesheet transform as a published document.

8. The method of claim 7, further comprising:
receiving an internet-based change request to the published document; and effecting the requested change to the published document.

9. An automated authoring and publishing system for generating a customized document about a product, the product comprising a plurality of components, the system comprising:
a processor coupled to an input interface;
a storage device coupled to the input interface and the processor, the storage device comprising code causing the processor to:
a) provide a user with a document manager input interface, the input interface including a template manager module, a data pools manager module, an automatic text generator module, a document editor module, an effectivity interface module, and a document builder module;
b) define a template based on a plurality of predefined data elements arranged in a tree-like data structure using the template manager module, the predefined data elements being retrieved from a parts library contained in the document builder module and defining parts and sections to be listed in the template;
c) create the customized document from the defined template using the document builder module;
d) edit the customized document using the document editor module by using content-specific pull-down menus on the computer to edit one or more of the predefined data elements and thereby generating revised data elements and storing the revised data elements in a relational database storing the customized document;
e) deconstruct the syntax of textual data elements that are syntactically joined with linguistic rules, specify a category in which to place a business rule, generate one or more tasks associated with a business rule and apply the business rule to the textual data elements or the document using the automatic text generator module;

f) modify data that is standard in particular data structures and customizing the data for particular applications using a data pools manager module;

g) establish effectivity associations, using the effectivity interface module, for a given component of the product, defining the manner in which a change to a given component is propagated throughout the customized document;

h) in response to a user making the change to the given component via the effectivity interface module, propagate the change throughout the customized document according to the effectivity associations established by the user;

i) synthesizing text from the revised data elements according to the (i) the structure defined by the template manager module, (ii) the edits made using the document editor module; (iii) the business rule applied by the user using the automatic text generator module, (iv) the customization data provided by the data pools manager module, and (v) the effectivity associations established by the user; and j) generate and publish the customized document.

10. The system of claim 9 wherein the processor tracks an effectivity in the customized document to track one of the predefined data element or revised data element across multiple other documents.

11. The system of claim 9 wherein the processor cross-references at least one of the predefined data elements and revised data elements to one or more other documents.

12. The system of claim 9 wherein the processor dynamically generates the content-specific pull-down menus based on a defined content type of the document template.

13. The system of claim 9 wherein the storage device further comprises executable code for the processor to publish the customized document by:
converting the customized document into an extensible markup language document;
forwarding the extensible markup language document to an extensible stylesheet transform; and
outputting the extensible markup language document from the extensible stylesheet transform as a published document.

14. A computer program product embodied on a computer readable storage medium, the storage medium comprising instructions for performing the steps of:
a) providing a user with a document manager input interface, the input interface including a template manager module, a data pools manager module, an automatic text generator module, a document editor module, an effectivity interface module, and a document builder module;
b) defining a template based on a plurality of predefined data elements arranged in a tree-like data structure using the template manager module, the predefined data elements being retrieved from a parts library contained in the document builder module and defining parts and sections to be listed in the template;
c) create the customized document from the defined template using the document builder module;
d) editing the customized document using the document editor module by using content-specific pull-down menus on the computer to edit one or more of the predefined data elements and thereby generating revised data elements and storing the revised data elements in a relational database storing the customized document;

e) deconstruct the syntax of textual data elements that are syntactically joined with linguistic rules, specify a category in which to place a business rule, generating one or more tasks associated with a business rule and apply the business rule to the textual data elements of the document using the automatic text generator module;

f) modify data that is standard in particular data structures and customizing the data for particular applications using a data pools manager module;

g) establish effectivity associations, using the effectivity interface module, for a given component of the product, defining the manner in which a change to a given component is propagated throughout the customized document;

h) in response to a user making the change to the given component via the effectivity interface module, propagate the change throughout the customized document according to the effectivity associations established by the user;

i) synthesizing text from the revised data elements according to the (i) the structure defined by the template manager module, (ii) the edits made using the document editor module; (iii) the business rule applied by the user using the automatic text generator module, (iv) the customization data provided by the data pools manager module, and (v) the effectivity associations established by the user; and j) generating and publishing the customized document.

15. The computer program product of claim 14, wherein the storage medium further comprises code for causing a computer to provide tasks pre-associated with the predefined data elements.

16. The computer program product of claim 14, wherein the storage medium further comprises code for causing a computer to cross-reference one of the predefined data elements or revised data elements to one or more other documents.

17. The computer program product of claim 14, wherein the storage medium further comprises code for causing a computer to dynamically generate the content-specific pull-down menus based on a defined content type of the document template.

18. The computer program product of claim 14, wherein the storage medium further comprises code for causing a computer to translate the customized document from an extensible markup language file to an output format selected using an extensible stylesheet language transform.

* * * * *